United States Patent
Dickie et al.

(10) Patent No.: US 11,194,780 B2
(45) Date of Patent: *Dec. 7, 2021

(54) EARLY EXIT FROM TABLE SCANS OF LOOSELY ORDERED AND/OR GROUPED RELATIONS USING NEARLY ORDERED MAPS

(71) Applicant: International Business Machines Corporation, Armonk, NY (US)

(72) Inventors: Garth A. Dickie, Framingham, MA (US); Dmitry Letin, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/134,033

(22) Filed: Sep. 18, 2018

(65) Prior Publication Data

US 2019/0018872 A1   Jan. 17, 2019

Related U.S. Application Data

(63) Continuation of application No. 14/551,796, filed on Nov. 24, 2014, now Pat. No. 10,108,651, which is a
(Continued)

(51) Int. Cl.
*G06F 16/22* (2019.01)
*G06F 16/248* (2019.01)
(Continued)

(52) U.S. Cl.
CPC ........ *G06F 16/2282* (2019.01); *G06F 16/248* (2019.01); *G06F 16/24578* (2019.01); *G06F 16/283* (2019.01); *G06F 16/951* (2019.01)

(58) Field of Classification Search
CPC ............... G06F 16/248; G06F 16/2282; G06F 16/24578; G06F 16/283; G06F 16/951
See application file for complete search history.

(56) References Cited

U.S. PATENT DOCUMENTS 5,495,608 A   2/1996   Antoshenkov
5,845,113 A   12/1998  Swami
(Continued)

FOREIGN PATENT DOCUMENTS

CN   101329676 A   12/2008
CN   101620617 A   1/2010
(Continued)

OTHER PUBLICATIONS

Herodotou et al.; "A SQL-Tuning-Aware Query Optimizer", Proceedings Of The VLDB Endowment, vol. 3, No. 1, Sep. 13-17, 2010, pp. 1-12.
(Continued)

*Primary Examiner* — Miranda Le
(74) *Attorney, Agent, or Firm* — Steven Bouknight; Edell, Shapiro & Finnan, LLC (57) ABSTRACT

According to embodiments of the present invention, methods, systems and computer-readable media are presented for scanning a plurality of storage regions within memory for a specified quantity of results, wherein each storage region is associated with an interval including first and second interval values indicating a value range for values within that storage region. The techniques comprise sorting the first interval values into an order, wherein the order of the first interval values determines a scanning order for the plurality of storage regions, determining a result value, wherein the result value is an upper bound, a lower bound, or is outside of the specified quantity of results, and examining the sorted first interval values and scanning corresponding individual storage regions in response to a comparison of the deter-
(Continued)

mined result value with the first interval value of that storage region. In some embodiments, scanning exits upon establishing that the specified quantity of results has been achieved and that a first interval value in a list of sorted first interval values is greater than the determined result value.

24 Claims, 8 Drawing Sheets

Related U.S. Application Data continuation of application No. 14/189,095, filed on Feb. 25, 2014, now Pat. No. 10,108,649.

(51) Int. Cl.
*G06F 16/28* (2019.01)
*G06F 16/951* (2019.01)
*G06F 16/2457* (2019.01)

(56) References Cited

U.S. PATENT DOCUMENTS

| | | | |
|---|---|---|---|
| 5,956,706 A | 9/1999 | Carey | |
| 6,003,036 A | 12/1999 | Martin | |
| 6,154,740 A | 11/2000 | Shah | |
| 6,487,546 B1 | 11/2002 | Witkowski | |
| 6,546,382 B1 | 4/2003 | Amor | |
| 6,622,138 B1 | 9/2003 | Bellamkonda | |
| 6,694,324 B1 | 2/2004 | Shatdal | |
| 6,795,817 B2 | 9/2004 | Agarwal | |
| 6,973,452 B2* | 12/2005 | Metzger | G06F 16/2282 |
| 7,243,001 B2 | 7/2007 | Janert | |
| 7,289,999 B2 | 10/2007 | Ellis | |
| 7,590,646 B2 | 9/2009 | Galinda-Legaria | |
| 7,756,889 B2 | 7/2010 | Yu | |
| 7,899,844 B2 | 3/2011 | Predovic | |
| 8,010,766 B2 | 8/2011 | Bhattacharjee et al. | |
| 8,046,394 B1 | 10/2011 | Shatdal | |
| 8,135,667 B2 | 3/2012 | Luo | |
| 8,204,873 B2 | 6/2012 | Chavan | |
| 8,216,870 B2* | 7/2012 | Morii | G01P 15/0802 438/50 |
| 8,296,306 B1 | 10/2012 | Whang et al. | |
| 8,315,980 B2 | 11/2012 | Ghosh | |
| 8,515,927 B2 | 8/2013 | Bailey | |
| 8,572,091 B1 | 10/2013 | Sivasubramanian et al. | |
| 8,601,038 B2 | 12/2013 | Plattner | |
| 8,620,888 B2* | 12/2013 | Basu | G06F 16/284 707/705 |
| 8,812,516 B2 | 8/2014 | Ingle | |
| 8,825,629 B2 | 9/2014 | Lawande | |
| 8,996,544 B2* | 3/2015 | Ziauddin | G06F 16/285 707/756 |
| 9,064,000 B1 | 6/2015 | Herrnstadt | |
| 9,087,094 B2 | 7/2015 | Netz | |
| 9,251,155 B1 | 2/2016 | Galimberti | |
| 9,330,130 B1 | 5/2016 | Yuan | |
| 9,372,889 B1 | 6/2016 | Jakobsson | |
| 9,378,243 B1 | 6/2016 | Korlapati | |
| 9,430,550 B2* | 8/2016 | Ziauddin | G06F 16/21 |
| 9,507,816 B2 | 11/2016 | Silvola | |
| 9,659,039 B2* | 5/2017 | Ziauddin | G06F 16/21 |
| 9,928,276 B2* | 3/2018 | Netz | G06F 16/24537 |
| 2002/0184253 A1* | 12/2002 | Agarwal | G06F 16/24532 |
| 2004/0249827 A1 | 12/2004 | Bhogal | |
| 2005/0076018 A1* | 4/2005 | Neidecker-Lutz | G06F 16/24554 |
| 2006/0212429 A1 | 9/2006 | Bruno | |
| 2007/0078826 A1 | 4/2007 | Bozkaya | |
| 2008/0059407 A1 | 3/2008 | Barsness | |
| 2009/0063396 A1 | 3/2009 | Gangarapu | |
| 2009/0063458 A1 | 3/2009 | Beavin | |
| 2009/0177622 A1 | 7/2009 | Hu | |
| 2010/0153429 A1 | 6/2010 | Xu | |
| 2010/0235606 A1 | 9/2010 | Oreland | |
| 2010/0257153 A1 | 10/2010 | Day | |
| 2011/0082854 A1 | 4/2011 | Eidson et al. | |
| 2011/0246432 A1 | 10/2011 | Yang | |
| 2012/0027084 A1 | 2/2012 | Zhang | |
| 2012/0317128 A1 | 12/2012 | Park | |
| 2012/0330954 A1 | 12/2012 | Sivasubramanian et al. | |
| 2013/0013605 A1 | 1/2013 | Stanfill | |
| 2013/0046784 A1 | 2/2013 | Ruehle | |
| 2013/0251235 A1 | 9/2013 | Lax | |
| 2014/0025626 A1 | 1/2014 | Mefford | |
| 2014/0095448 A1 | 4/2014 | Marwah | |
| 2014/0172804 A1 | 6/2014 | Kaufmann | |
| 2014/0229464 A1 | 8/2014 | Milenova | |
| 2015/0032758 A1 | 1/2015 | Schneider | |
| 2015/0242452 A1 | 8/2015 | Dickie et al. | |
| 2015/0242506 A1 | 8/2015 | Dickie et al. | |
| 2017/0052990 A1 | 2/2017 | Dickie et al. | |

FOREIGN PATENT DOCUMENTS

| | | |
|---|---|---|
| CN | 103500224 A | 1/2014 |
| WO | 2008127872 | 10/2008 |

OTHER PUBLICATIONS ip.com et al.; "Method And System Of Restructuring Imperfect Loop Nest With Early Exits To Facilitate Locality Transformations", IPCOM000232309D, Oct. 31, 2013, pp. 1-7.
ip.com et al.; "System And Method For GROUP BY With IN-LIST Subquery Optimization", IPCOM000229573D, Aug. 6, 2013, pp. 1-6.
Graefe; "Fast Loads and Fast Queries", Springer-Verlag, Berlin, Heidelberg, DaWaK 2009, LNCS 5691, pp. 111-124.
Ilyas et al., "A Survey of Top-k Query Processing Techniques in Relational Database Systems", ACM Computing Surveys, vol. 40, No. 4, Article No. 11, Oct. 2008, pp. 1-61.
PCT International Search Report and Written Opinion of the International Searching Authority, PCT/IB2015/050704, dated Apr. 14, 2015, 6 pages.

* cited by examiner

EARLY EXIT FROM TABLE SCANS OF LOOSELY ORDERED AND/OR GROUPED RELATIONS USING NEARLY ORDERED MAPS

CROSS-REFERENCE TO RELATED APPLICATIONS

This application is a continuation of U.S. patent application Ser. No. 14/551,796, entitled "EARLY EXIT FROM TABLE SCANS OF LOOSELY ORDERED AND/OR GROUPED RELATIONS USING NEARLY ORDERED MAPS", filed Nov. 24, 2014, which is a continuation of U.S. patent application Ser. No. 14/189,095, entitled "EARLY EXIT FROM TABLE SCANS OF LOOSELY ORDERED AND/OR GROUPED RELATIONS USING NEARLY ORDERED MAPS", filed Feb. 25, 2014, the disclosures of which are incorporated herein by reference in their entireties.

BACKGROUND

1. Technical Field

Present invention embodiments relate to reducing computational workload for query evaluation, and more specifically, to reducing computational workload by utilizing information in zone maps to govern conditional exits from table scans.

2. Discussion of the Related Art

Searching for information using a query may result in a search of a large database table. Information stored in a large database table is typically not maintained in sorted form due to heavy computational cost associated with sorting and reorganizing. Indexing, which maps a set of data values onto a set of records that relate to those data values, may be used to provide the effect of storing the data in sorted order. However, distributed data warehouses that store large database tables may split a set of records across multiple storage disks, and co-locating a portion of the index that maps a given data value with the records that relate to that data value may require additional network overhead, leading to poor latency and increased computational workload.

When query evaluation requires scanning a large table, some data warehouse management systems may maintain metadata about each region of table storage.

BRIEF SUMMARY

According to one embodiment of the present invention, methods, systems and computer-readable media are presented for scanning a plurality of storage regions within memory for a specified quantity of results, wherein each storage region is associated with an interval including first and second interval values indicating a value range for values within that storage region. The techniques comprise sorting the first interval values into an order, wherein the order of the first interval values determines a scanning order for the plurality of storage regions and determining a result value, wherein the result value is an upper bound, a lower bound, or is outside of the specified quantity of results. Sorted first interval values are examined and corresponding individual storage regions are scanned in response to a comparison of the determined result value with the first interval value of that storage region. In other embodiments, the techniques disclosed herein may include sorting the second interval values.

BRIEF DESCRIPTION OF THE SEVERAL VIEWS OF THE DRAWINGS

Generally, like reference numerals in the various figures are utilized to designate like components.

DETAILED DESCRIPTION

Data warehouse queries may frequently sort and limit a set of result values to a subset of result values. Typical methods include scanning large data tables to find results in response to a query, sorting and/or aggregating the results, and discarding all but, e.g., a set of top-N results, where N is any integer, e.g., 50.

When a large table is stored on disk, it may be large enough or fragmented enough that it becomes time consuming to move the disk head to many different disk regions to search the large table. Metadata corresponding to a region of storage may be used to characterize table data contained within the region of storage. For example, a first interval value may represent a minimum data value for each column, for each range of rows, and a second interval value may represent a maximum data value for each column, for each range of rows. Both the first and second interval values represent types of metadata that may be determined for various regions of storage, and (in combination with additional types of information) may also be referred to as "zone maps". The use of zone maps to identify particular data ranges within a storage region, according to present invention embodiments, reduces disk scan time and computational load. It should be noted that minimum values and maximum values of the zone map may be conservative. In other words, a minimum value of a zone map entry may be less than the actual minimum for the corresponding storage region of data (e.g., due to a record deletion, etc.), and similarly, a maximum value of a zone map entry may be greater than the actual maximum for the corresponding storage region of data.

Embodiments of the present invention provide techniques to utilize zone maps to exit early from query evaluation upon meeting a specified condition. By sorting a list of minimum data values (also referred to as first interval values) of zone maps, or alternatively, a list of maximum data values (also referred to as second interval values), a table scan may exit, e.g., stop reading a table, after determining that all results which can possibly be part of a top-N sort have been identified. Thus, the techniques disclosed herein may reduce computational demands from I/O operations, such as read/write operations. In preferred embodiments, the techniques presented herein apply to queries which include a top-N sort, i.e., an "ORDER BY" clause followed by a "LIMIT" clause.

Figure 1:
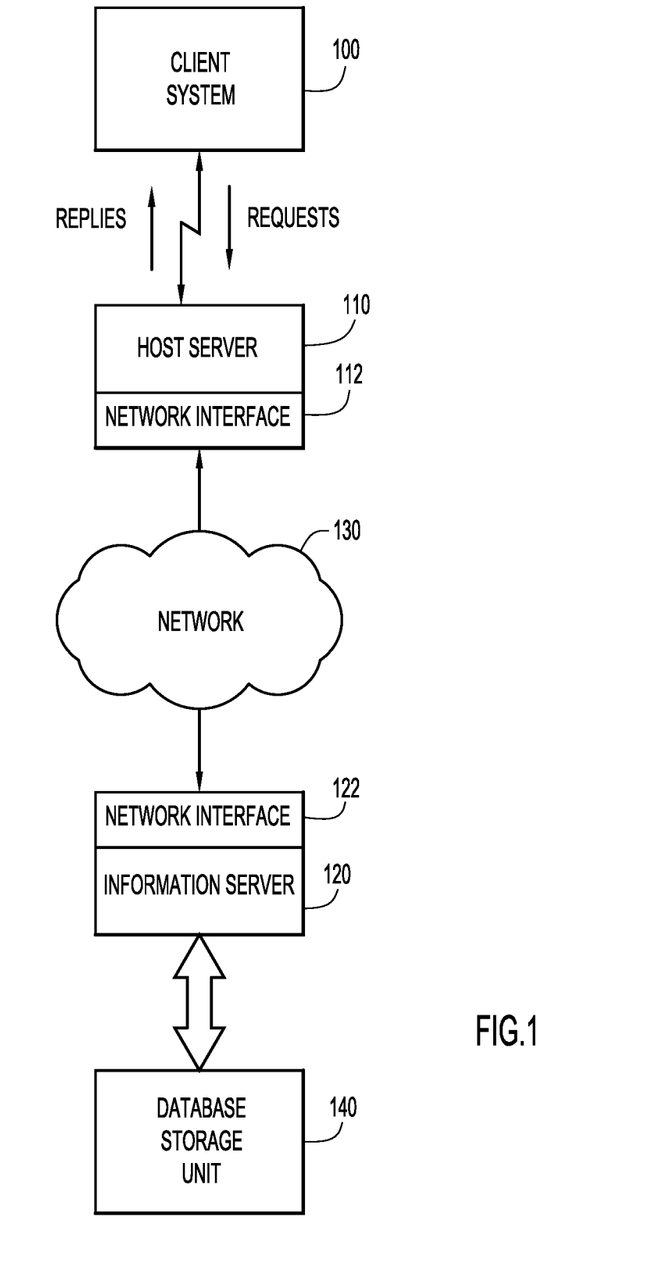
FIG. 1 is an illustration of an example computing environment for use with an embodiment of the present invention.

With reference now to FIG. 1, an example computing environment for use with present invention embodiments is illustrated. Specifically, the environment includes one or more client or end-user systems 100 and one or more server systems 110 and 120. Host server system 110 and information server 120 may be remote from each other and communicate over a network 130. Query requests, originating from client system 100 may be transmitted to information server 120 to search stored data on database storage unit 140. Network 130 may be implemented by any number of any suitable communications media (e.g., wide area network (WAN), local area network (LAN), Internet, Intranet, etc.). Alternatively, server systems 110 and 120 may be local to each other, and communicate via any appropriate local communication medium (e.g., local area network (LAN), hardwire, wireless link, Intranet, etc.). Network interface units are shown at 112 and 122.

Client system(s) 100 enable users to submit documents (e.g., documents for document collections, documents for analysis, etc.) to information server system 120 for storage in a database storage unit. As discussed herein, documents (or other information) may be added to existing database storage as storage regions (also referred to as extents).

Database storage unit 140 may store information for analysis (e.g., results for a top-N search, etc.), and may be implemented by any conventional or other database or storage unit. Database storage unit 140 may be local to or remote from information server 120, and may communicate via any appropriate communication medium (e.g., local area network (LAN), wide area network (WAN), Internet, hardwire, wireless link, Intranet, etc.). Client system 100 may present a graphical user (e.g., GUI, etc.) or other interface (e.g., command line prompts, menu screens, etc.) to solicit information from users pertaining to the desired documents and analysis, and may provide reports including analysis of results (e.g., text analytics, search results, profile scores, etc.).

A plurality of database storage units 140 may be present in a data warehouse. An information server 120 may store and retrieve information from database storage unit 140, at the direction of host server 110. Host server 110 receives requests from and replies to client system 100. In one embodiment, the memory space within database storage unit 140 may be divided into several partitions, including a primary partition for storing user information, a mirror partition for storing a backup copy of the primary information, a temporary partition for holding intermediate results at the direction of information server 120, and a core partition for holding information about the physical layout of information within the database storage unit 140.

Figure 2A:
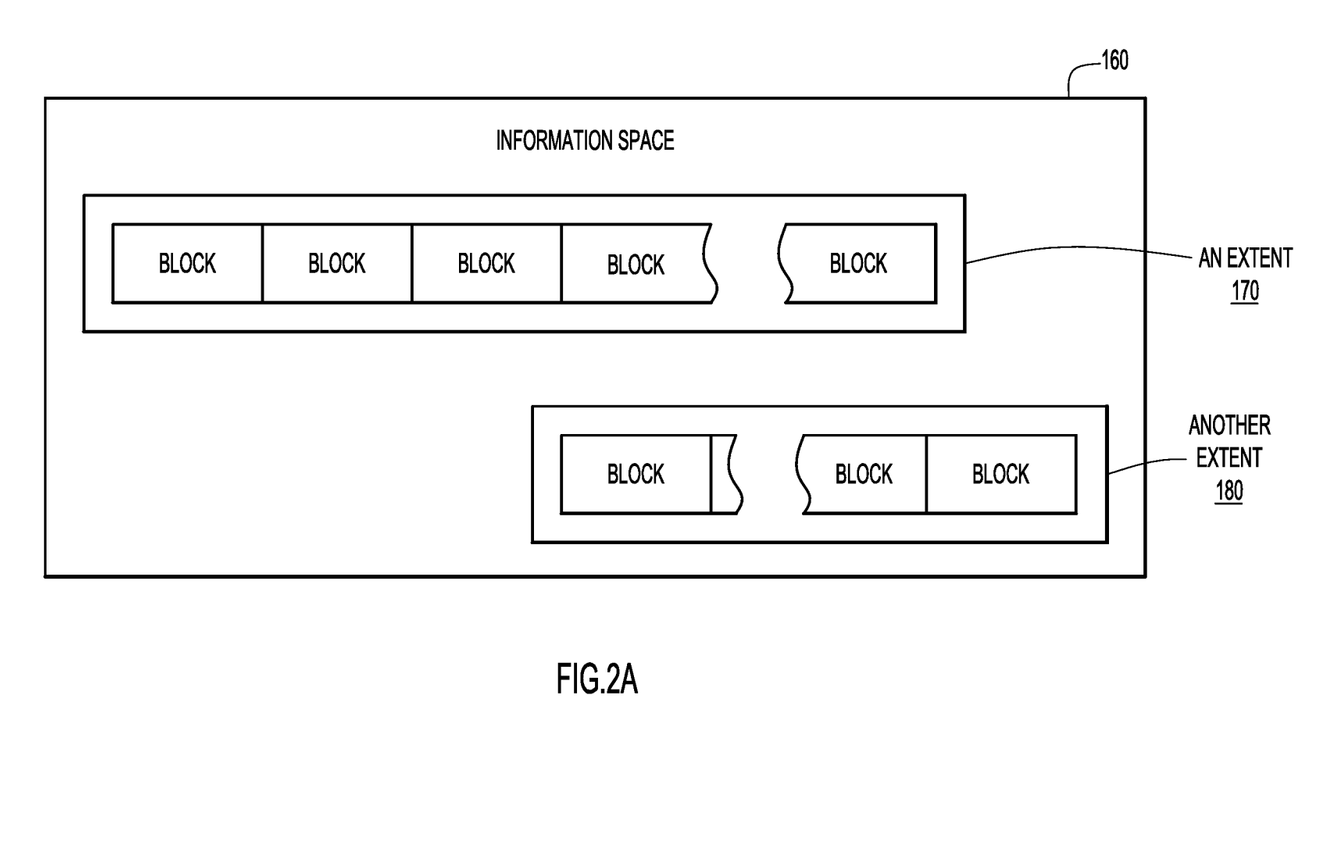
FIG. 2A is an illustration of an example of regions (extents) of table storage according to an embodiment of the present invention.

Referring to FIG. 2A, an embodiment of the invention operates by dividing a large space of information 160 into multiple smaller regions of information 170 and 180 (also referred to as "extents" or "storage regions"). Each extent may be further subdivided into a number of contiguous fixed size or variable size sub-extent blocks. An advantage of using fixed sizes is that certain computations become faster and less complex. In alternative embodiments of the invention, fixed sizes may also be changed dynamically, based on size or other characteristics of the overall database. Variable block sizes may be dynamically modified based on, e.g., a type of attribute. For example, if the minimum data value (also called first interval values) and the maximum data value (also called second interval values) refer to time stamp data, a size of the extent may be varied so that all data for a particular time period is stored in one data block. A block is the smallest unit of transfer between the database storage unit 140 holding the entire information space and the information server 120 capable of examining and manipulating the information. In one embodiment, a block may be 128K bytes, but other sizes could work as well.

An extent 170, 180 is a convenient unit of storage allocation, so that as an information space grows, its growth is quantized into units of extents. While the address space within an extent is contiguous (i.e., no holes) an information space 160 may consist of discontiguous extents, as there is no requirement that a later allocation of an extent should produce an address range that bears any fixed relationship to the address range of any earlier allocation.

Figure 2B:
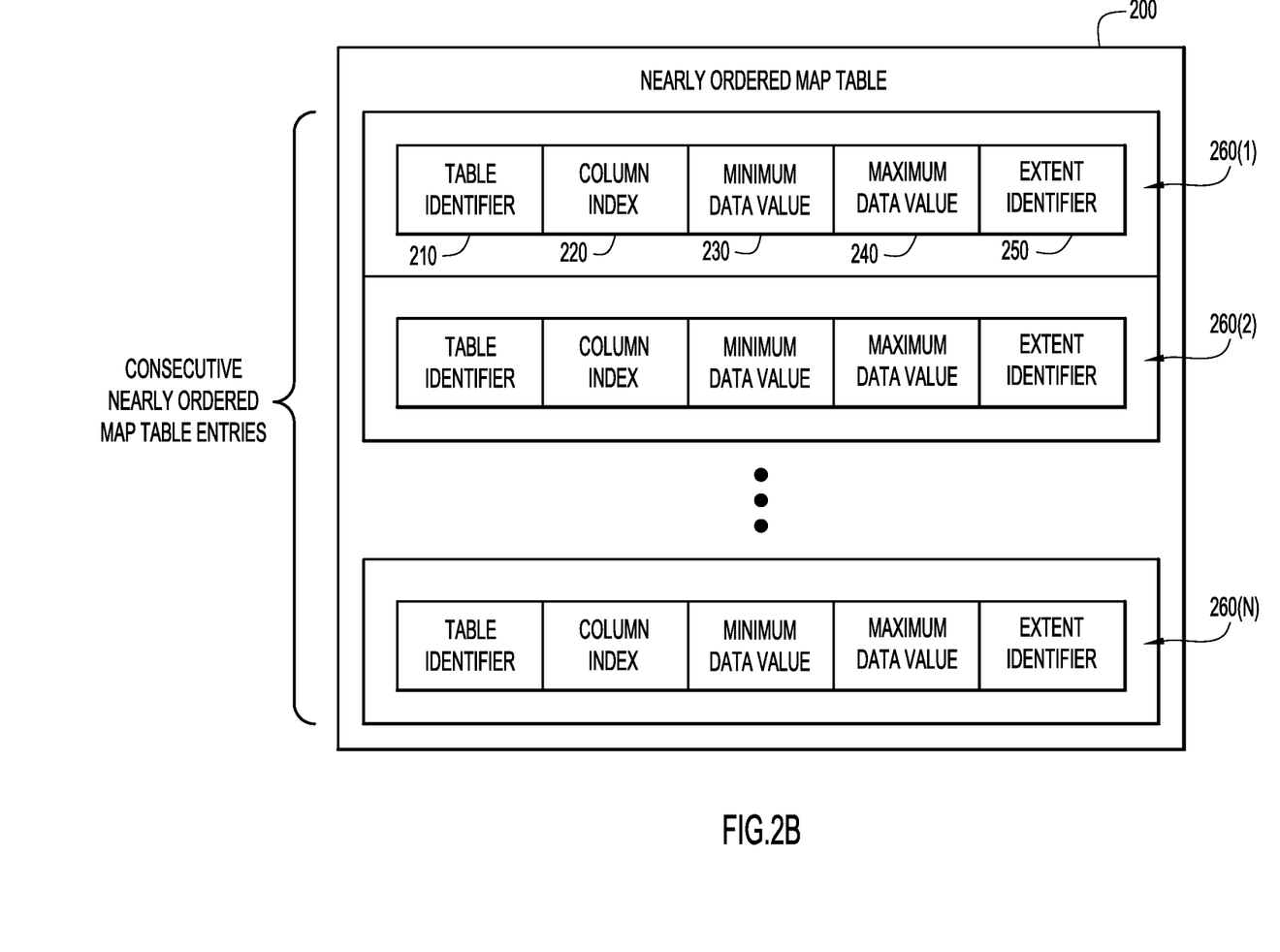
FIG. 2B is an illustration of an example of metadata corresponding to regions of table storage according to an embodiment of the present invention.

Referring to FIG. 2B, an embodiment of the present invention annotates extents with statistics (e.g., metadata) about the information the extent contains, and this information may be stored as entries in a nearly ordered map table or list 200. As shown in FIG. 2B, nearly ordered map table 200 shows a structure comprising a table identifier 210, a column index 220, a minimum data value 230, a maximum data value 240, and an extent identifier 250. Multiple entries of metadata are shown at 260(1)-260(N). The table identifier 210 uniquely designates an information space, which may correspond to, e.g., a relational database table. In one embodiment, it is a 4-byte numeric value, which uniquely identifies a relational database table. The column index 220 uniquely identifies a particular class of information within the information space identified by the table identifier 210. In one embodiment, column index 220 is a 2-byte numeric value that denotes a column in the relational table identified by the table identifier 210. In another embodiment, the column index value 220 may correspond to the order in which columns are defined within the relational table.

In one embodiment of the invention, the minimum data value 230 and the maximum data value 240 may be 8-byte quantities that can hold different types of data values, including dates, times, date-times, integer values, etc. The actual types of data held by the minimum data value and the maximum data value are specified in the definition of the column that is denoted by the column index 220. In one embodiment, the extent identifier 250 may be a 2-byte numeric value, which designates a particular extent within the information space as designated by table identifier 210. Larger storage partitions would use either 4-byte extent identifiers or larger extents.

Minimum data value 230 and maximum data value 240 correspond to the minimum and maximum data values for particular kinds of information within an extent. When a query evaluation for information includes a restriction based on a value, the value can be compared to the metadata associated with each extent, e.g., the minimum data value of each extent, to determine if the extent should be searched. These techniques are described below in conjunction with FIGS. 3 and 4.

Zone maps typically utilize a small amount of disk space, may be co-located with the corresponding data that they describe, introduce a minimal amount of computational latency into the system, and may be maintained without sophisticated database administration experience. It is noted that the concept of zone maps are not limited to the particular types of metadata information shown in FIG. 2. Additional types of metadata information, used to characterize a region of storage (extent) are understood to fall within the scope of the embodiments disclosed herein.

Figure 3:
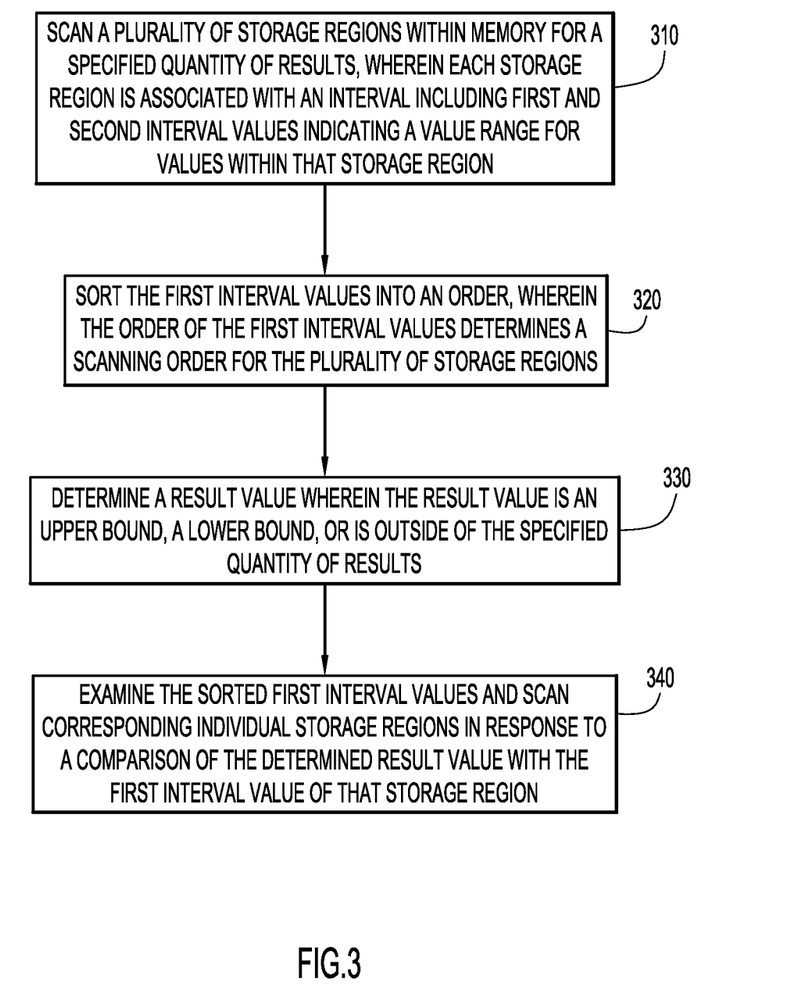
FIG. 3 is a procedural flow chart generally illustrating use of metadata associated with a storage region to determine whether to scan the storage region, according to an embodiment of the present invention.

FIG. 3 provides a general overview of embodiments of the present invention. Operation 310 scans a plurality of storage regions within memory for a specified quantity of results, wherein each storage region is associated with an interval including first and second interval values indicating a value range for values within that storage region. At operation 320, the first interval values are sorted into an order, wherein the order of the first interval values determines a scanning order for the plurality of storage regions, e.g., in ascending or descending order. At operation 330, a result value is determined, wherein the result value is an upper bound, a lower bound, or is outside of the specified quantity of results. At operation 340, the sorted first interval values are examined, and corresponding individual storage regions are scanned in response to a comparison of the determined result value with the first interval value of that storage region.

Figure 4A:
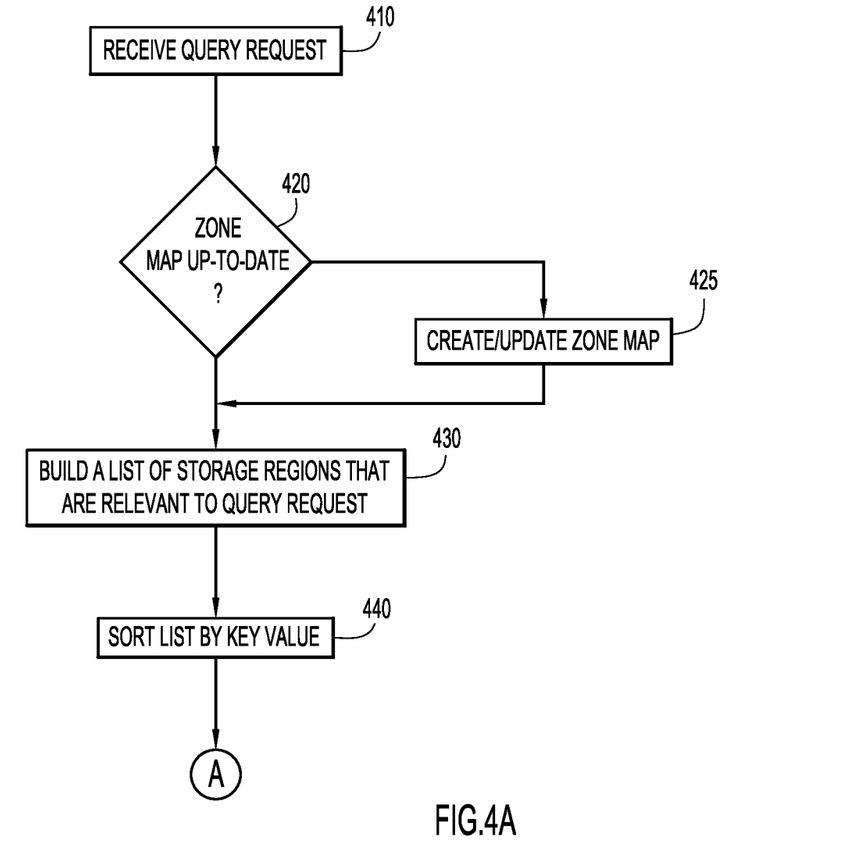
FIGS. 4A-4B are a more specific procedural flow chart based upon the flow chart of FIG. 3 and illustrating a manner in which metadata may be used to govern conditional exits from table scans according to an embodiment of the present invention.
Figure 4B:
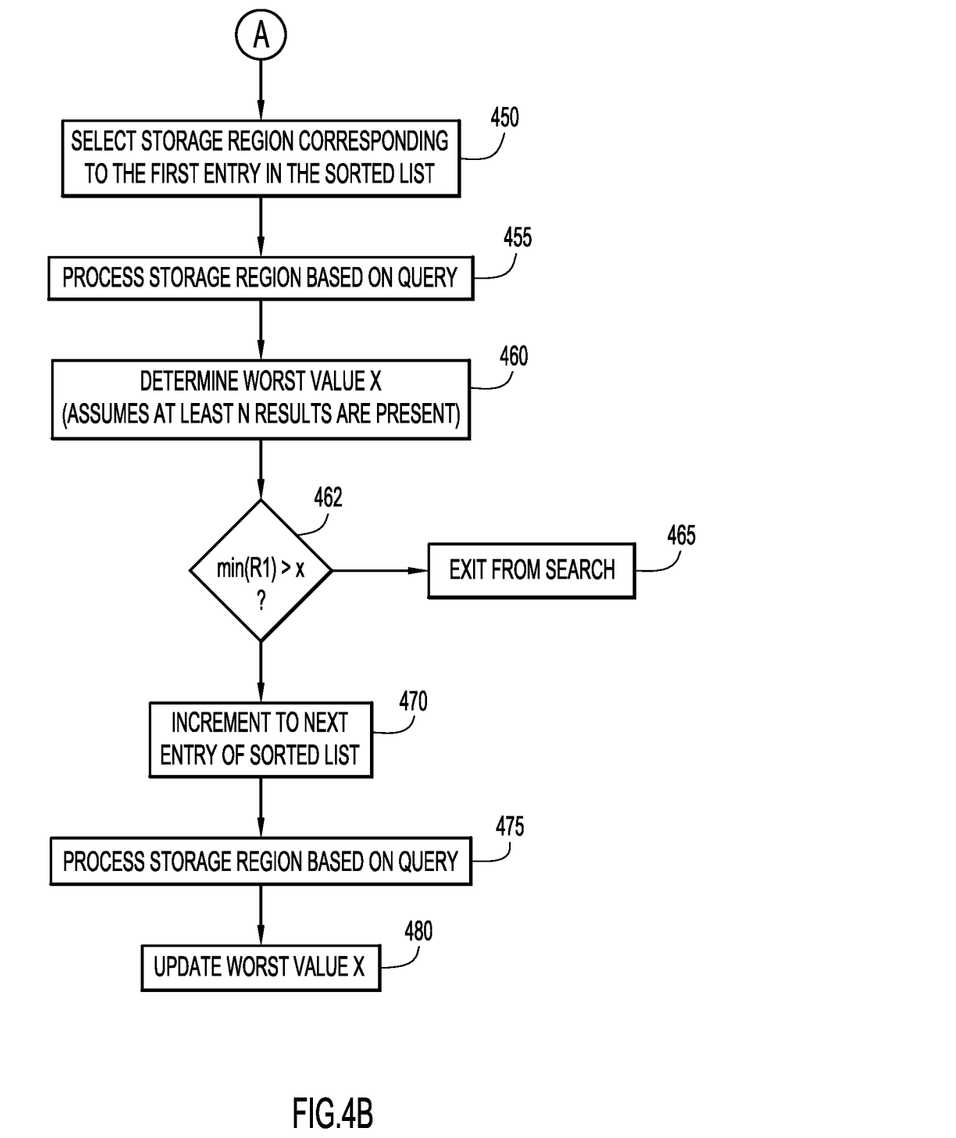

Referring to FIGS. 4A-4B, an example flow chart of a more detailed series of operations provided in the flow chart of FIG. 3 is shown. It is understood that the techniques provided herein may encompass alternate orderings of one or more of the operations shown in FIGS. 4A-4B. For example, different orderings of operations may occur to achieve the same result and are encompassed by the techniques disclosed herein.

Present invention embodiments may be applied to queries including a top-N sort (e.g., via "ORDER BY" combined with "LIMIT N" clauses). Top-N sorts generally utilize a partial sorting algorithm to sort an array of m elements, such that the top-N result(s) contain the smallest values of elements m, if sorted, e.g., in ascending order. In general, top-N sorts contain a subset of elements of the array of m elements, provided that the number of elements m is greater than the number of top-N elements. While partial sort algorithms save much of the work associated with sorting when only top results are wanted, such algorithms do not reduce workload on I/O operations such as read/write.

Present invention embodiments may also be applied to queries including a grouping operation followed by a top-N sort (e.g., via "GROUP BY", "ORDER BY", and/or "LIMIT N" clauses, wherein the order is determined by any subset of the grouping columns), if the aggregation data structures are maintained as in a top-N sort.

Present invention embodiments may also encompass performing grouping using a top-N sort data structure, in which the best N groups are retained. For example, a query may perform a grouping operation on one or more columns, e.g., "SELECT . . . GROUP BY A, B". The results of the grouping operation may be sorted, such that the sort keys are a subset of the grouping keys—e.g., "ORDER BY A", "ORDER BY B", or "ORDER BY A, B". Finally, the results may be limited, as in "LIMIT 10". (New records may be grouped by finding an existing group to which they belong, or by creating a new group.) Groups may be identified based upon one or more sort keys (e.g., such as equality to one or more sort keys), and a specified quantity of results comprises distinct groups (e.g., generally, a specified quantity of results will be a specified quantity of distinct groups). Similar to a top-N sort without a "GROUP BY" operation, scanning storage regions can be avoided in cases in which a minimum value of a storage region for an ascending sort exceeds a current worst grouping key in the top-N data structure, or in a descending sort in which a maximum value of a storage region is less than a current worst grouping key in the top-N sort data structure.

It is also understood that zone maps are not intended to be limited to a single first interval value or a single second interval value, but may contain multiple intervals, each corresponding to a minimum value and a maximum value for a particular type of data.

Referring again to FIG. 4A, at operation 410, a query request is received. At operation 420, it is determined whether or not metadata (e.g., a zone map) has been created for each storage region and is up to date. At operation 425, zone maps are created/updated if not already present. At operation 430, storage regions/extents relevant to the query (to be scanned) are determined, and a list is built/created containing metadata characterizing these relevant storage regions. At operation 440, this list of regions may be sorted, prior to performing I/O operations, using the column which is the primary sort key for the top-N sort, in ascending or descending order. As an example of producing a list of storage regions to be processed, if a storage region is known to contain records with column values between 100 and 200 (e.g., as indicated in zone map metadata), then when a query with range values outside of the known range (e.g., a query with a value of 500) is evaluated, the evaluation can eliminate the entire storage region from being scanned. As discussed herein, zone maps store, e.g., a minimum data value and a maximum data value for each column, for each range of rows. Thus, it is the order of the zone map data in the sorted list that determines the order of the table scan. The data contained within the information space does not need to be ordered, partially ordered, or bucketed with respect to the sort column.

If a top-N sort prefers small values (e.g., an ascending sort), then the list of storage regions may be sorted by minimum data values (i.e., first interval values), and regions without small values will be moved to the end of the list. If a top-N sort prefers large values (e.g., a descending sort), then the list of storage regions may be sorted by maximum data values (i.e., second interval values), and regions without large values will be moved to the end of the list.

At operation 450 of FIG. 4B (continuing from operation 440 of FIG. 4A), a storage region corresponding to the first entry in the sorted list is selected. At operation 455, a selected storage region is processed based on a query. At operation 460, a result value x or worst value x (assuming at least N results are present) of the values in the top-N sort is determined. It is noted that this step, for simplicity, assumes that processing a single storage region will populate the top-N results with at least N values. If this is not the case, then additional storage regions will be processed until this condition is met. At operation 462, a minimum data value of a region, min(R1), of a first entry of the sorted list is determined. Operation 462 provides a conditional expression for comparing result value x with the minimum data value of a storage region. When processing a top-N sort, if the Nth value is x (a current "worst" value), then regions containing a minimum data value that are greater than x do not need to be scanned (for an ascending sort). If this condition is not met, the next entry of the sorted list is selected at operation 470. At operation 475, the storage region is processed based on the query. At operation 480, worst value x is updated. This series of operations repeats until the specified condition is satisfied. Once this condition is satisfied, there are no additional values that overlap with the top-N results. If the Nth value of a top-N search is x, and the minimum data value for a region, min(R1) is greater than the value of x, then the entire storage region may be discarded.

Moreover, by sorting the list of selected storage regions by minimum data values, once a storage region R1 is found such that the minimum data value of R1 is greater than the worst value of a top-N sort x, then all subsequent regions R2, R3, and so forth will also have minimum data values greater than x. As a result, the scan may exit early and stop reading data, as shown below with reference to Eq. 1 and at operation 465.

if min(R1)>x, $$\text{then min}(R2) >= \text{min}(R1) > x \qquad (\text{Eq. 1})$$

A storage region with a minimum data value exceeding x has no results within the top-N results, and therefore, the entire storage region can be discarded, as it does not need to be included in the search. Moreover, once a storage region in the list has been discarded, all subsequent storage regions in the list may be discarded (provided that the list of storage regions has been sorted). In many cases, this will allow an early exit from a table scan, as a point is reached in which none of the remaining regions can possibly hold a value which will survive a top-N sort. For small N, the techniques presented herein are effective at reducing the I/O needed to answer a query to a bare minimum, resulting in a significant performance impact.

It should be noted that in cases having multiple sort keys, the above comparison (e.g., Eq. 1) applies—a zone map entry having a value equal to x cannot automatically be discarded, because a lower-priority sort key (e.g., a second sort key) may determine that the entry is to be included. However, in cases in which a single sort key is used, then the comparison above may be improved as shown by Eq. 2.

$$\text{if min}(R1) >= x, \text{ then min}(R2) >= \text{min}(R1) >= x \qquad (\text{Eq. 2})$$

The current worst result may also be referred to as a "result value". While FIG. 4 represents the result value as a current worst value of a top-N sort, i.e., an upper bound for an ascending sort and a lower bound for a descending sort, it is noted that present invention embodiments may also include values outside of the specified quantity of results. Values outside the specified quantity of results include values greater than the actual upper bound as well as values less than the actual lower bound. An upper bound is a maximum value of the values of the top-N sort. A lower bound is a minimum value of the values of the top-N sort.

It should also be noted that as the scan proceeds, the result value generally improves over time (e.g., if the result value is a minimum value, the result value may further decrease as the scan proceeds and a new minimum value is identified). Improving result values allow for even more data to be skipped as the scan proceeds, and therefore, further reduces computational workload from I/O operations.

Present invention embodiments provide feedback, from a top-N sort algorithm, up to the I/O layer, in order to reduce computational workload. The decision to make an early exit, as described above, allows associated I/O operations to stop, and therefore, provides a form of feedback to the I/O layer. Sorting the list of zone map entries provides an optimization—as soon as a determination has been made to exit early from a top-N sort, associated computational workload from I/O operations may be avoided.

Thus, when a query scans a large information space for values in a specified range, according to present invention embodiments, a list of zone map data, associated with each storage region, is created, sorted, and examined to determine whether the storage regions could possibly contain values in the specified range of the top-N sort. Only regions that could contain values within the specified range are scanned; other regions do not need to be considered. The techniques described herein allow for substantially reducing the amount of time needed to scan a large space of information.

The techniques presented herein also allow prediction of a best possible early estimate of top-N results. For example, if a first storage region has a corresponding zone map entry indicating a range of values from 1-5, and a second storage region has a corresponding zone map entry indicating a range of values from 3-20, relevant data would more likely fall within the first region (assuming an ascending sort is used), and this region would be read first. Accordingly, utilization of the sorted metadata allows relevant results to be identified in an optimal manner.

In other embodiments, the techniques presented herein may be used to obtain an optimal early exit from a table scan when a downstream operation is a grand aggregate min (column) or max(column) operation; this is a degenerate case of top-N sort where the limit is 1 and the selected column is the sort key.

In this case, the partial sort operation may degenerate to, or be replaced by, an operation which keeps only one record, e.g., the record with the minimum value of the sort key or the record with the maximum value of the sort key. For an operation that keeps the record with the minimum value of the sort key, any storage region whose minimum value, as indicated by the corresponding zone map entry, is higher than the sort key may be skipped. (Alternatively, if an operation keeps the record with the maximum value of the sort key, any storage region whose maximum value is less than the sort key may be skipped.) This optimization may be effective even when the data is partially or completely unordered, and very few storage regions are excluded in the initial process of evaluating the zone maps. If there is a single sort key, the operation may exit as soon as a value is found that is less than or equal to the minimum value of every remaining zone map entry. If there are multiple sort keys, the operation may exit as soon as a value is found that is less than the minimum value of every remaining zone map entry.

In still other embodiments, for poorly organized columns in which min(region)-max(region) is almost the entire range of the column for every region, there will still be some variance in the endpoints. Thus, the smallest few values are likely to appear in only a few storage regions. These storage regions will be scanned first to select a sufficiently small "result value" that will exclude the remaining storage regions. Thus, for a small enough N in a top-N sort, the techniques provided herein generally produce a good result.

Present invention embodiments are not limited to a particular type of computing environment. For example, present invention embodiments may apply to a system comprising several computers or processes, each of which may independently perform a top-N sort to produce a local list of top-N results. Each of the independent lists may be merged, such that the top-N results after the merge are kept. Thus, in this context, each computer or process may independently generate a list of top-N results, and may exit early from a top-N sort, independently from one another.

Alternatively, present invention embodiments also apply to systems in which multiple computers may collaborate to maintain a global result value, wherein the global result value corresponds to a current global worst result value (e.g., a global minimum value or a global maximum value) of a plurality of top-N sorts performed by a plurality of computers. Accordingly, each computer may prune its corresponding scan list and/or determine to exit early from a top-N sort based on this global result value. It should also be noted that there is not a significant performance penalty for scanning a small number of additional storage regions. Therefore, the global result value may be computed asynchronously, or may be updated infrequently, such that this optimization does not introduce or require a point of synchronization within the system.

Figure 5:
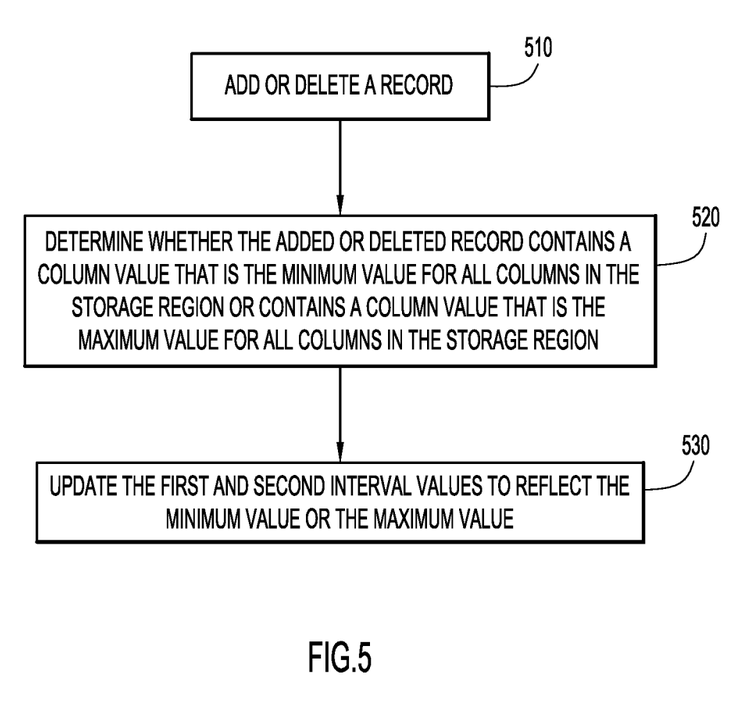
FIG. 5 is another procedural flow chart illustrating a manner in which metadata associated with storage regions may be updated as records in storage regions are added or deleted according to an embodiment of the present invention.

FIG. 5 is a generalized flow chart of a procedure for updating previous zone map entries due to the addition or deletion of records within a storage region. When a record is deleted from an information space, if that record contained a column value that was the minimum value for all columns in the record's extent, then the new minimum value for that column in that extent may actually be greater than the recorded minimum value in the zone map entry. Similarly, if that record contained a column value that was the maximum value for all columns in the record's extent, then the new maximum value for that column in that extent may actually be less than the recorded maximum value in the zone map entry. In other words, deleting a record can have the effect of narrowing the range of values for columns within an extent. Likewise, creating a record can have the effect of expanding the range of values for columns within an extent.

At operation 510 of FIG. 5, a record is added or deleted. At operation 520, it is determined whether the added or deleted record contains a column value that is the minimum value for all columns in the record's extent, and/or whether the added or deleted record contains a column value that is the maximum value for all columns in the record's extent. At operation 530, the zone map is updated to reflect the new minimum value (e.g., lowered at least to the value specified in the added record or raised to reflect the lowest value in the storage region) and/or updated to reflect the new maximum value (e.g., raised at least to the value specified in the added record or lowered to reflect the highest value in the storage region). In other embodiments, zone maps may not need to be updated to reflect record deletions, as zone maps are generally used in a conservative manner.

Figure 6:
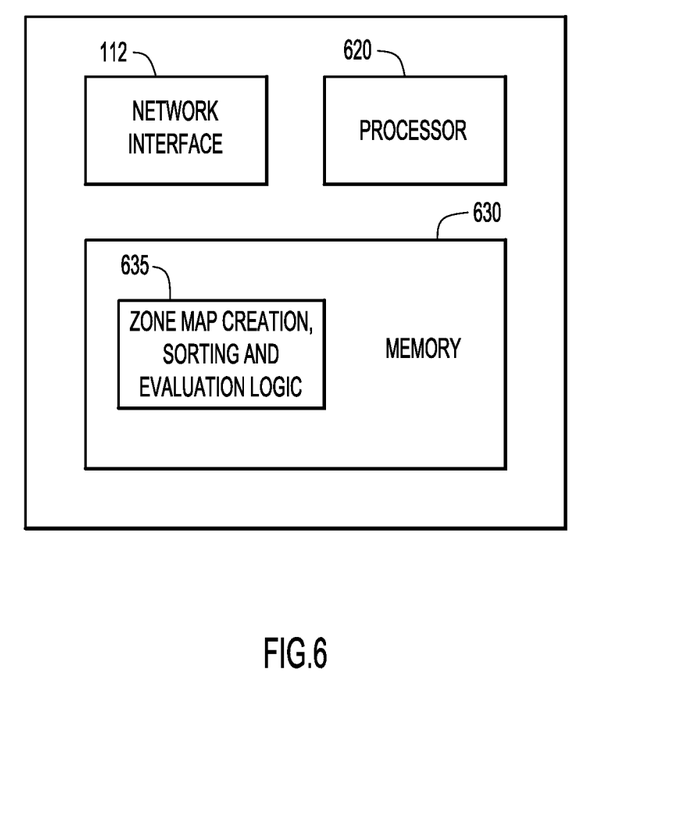
FIG. 6 is an example of a system/apparatus according to an embodiment of the present invention.

Referring to FIG. 6, an example embodiment of an information server 120 may comprise a network interface 112, a processor 620 and a memory 630. The network interface unit 112 is configured to enable network communications over network 130 e.g., to facilitate communication between information server 120 and host server 110 regarding query requests from client system 100 as shown in FIG. 1.

The processor 620 may be embodied by one or more microprocessors or microcontrollers, and executes computer readable program instructions stored in memory 630 to perform the operations described above in connection with FIGS. 1-5.

Memory 630 may comprise computer readable storage media encoded with software comprising computer readable program instructions, and when the software is executed by the processor 620, the processor 620 is operable to perform the operations described herein in connection with zone map creation, sorting and evaluation logic 635.

Server systems 110 and 120 and client systems 100 may be implemented by any conventional or other computer systems preferably equipped with a display or monitor, a base (e.g., including at least one processor, one or more memories, and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Alternatively, one or more client systems 100 may analyze documents when operating as a stand-alone unit. In a stand-alone mode of operation, the client system stores or has access to the data (e.g., database storage unit 140), and includes modules to formulate and/or send query requests to host server 110. The graphical user (e.g., GUI, etc.) or other interface (e.g., command line prompts, menu screens, etc.) solicits information from a corresponding user pertaining to the desired documents and analysis, and may provide reports including analysis results.

Module may include one or more modules or units to perform the various functions of present invention embodiments described herein. The various modules (e.g., logic module 635, etc.) may be implemented by any combination of any quantity of software and/or hardware modules or units, and may reside within memory 630 of the information server 120 for execution by processor 620.

It will be appreciated that the embodiments described above and illustrated in the drawings represent only a few of the many ways of implementing embodiments for.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing systems (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., logic 635) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., software corresponding to logic 635, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., database storage unit 140, zone maps, top-N results, etc.). The database system may be implemented by any number of any conventional or other databases, data stores or storage structures (e.g., files, databases, data structures, data or other repositories, etc.) to store information (e.g., database storage unit 140, zone maps, top-N results, etc.). The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., query requests from client 100, top-N results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, demographic information pertaining to the document author, etc.).

The present invention embodiments are not limited to the specific tasks or algorithms described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
scanning a plurality of storage regions within memory for a specified quantity of results, wherein each storage region is associated with an interval including minimum and maximum values indicating a value range for values of data within that storage region and with an interval value including one of the minimum value and the maximum value, and wherein scanning the plurality of storage regions comprises:
determining a list of storage regions with data relevant to a query requesting a specified quantity of sorted results by comparing a predicate of the query to the associated minimum and maximum values of the storage regions to identify storage regions containing values of data relevant to the query predicate, wherein two or more storage regions in the list have data with overlapping value ranges and the interval values associated with the two or more storage regions are unordered;
determining a scanning order for scanning the determined storage regions of the list for data by sorting the interval values associated with the determined storage regions of the list, and arranging the determined storage regions of the list in the scanning order according to the sorted order of the associated sorted interval values;
scanning the determined storage regions of the list for data successively in the scanning order according to the sorted order of the associated interval values to determine a set of sorted results for the query; and
in response to the set of sorted results attaining the specified quantity for the sorted results of the query during, and prior to completion of, the scanning of data of each of the determined storage regions of the list:
comparing a value of data at an end position of the set of sorted results at a current determined storage region in the scanning order with the interval value of a next determined storage region in the scanning order that remains unprocessed by the scanning of the determined storage regions of the list;

exiting from scanning the determined storage regions of the list for data prior to scanning the next determined storage region in the scanning order when the comparing indicates that the value of data at the end position of the set of sorted results resides outside the value range of the next determined storage region, wherein the exiting from scanning occurs prior to scanning each of the determined storage regions of the list containing data with values relevant to the query predicate; and producing the set of sorted results as results for the query, wherein the query results are attained prior to scanning each item of data satisfying the query predicate within the determined storage regions of the list.

2. The computer-implemented method of claim 1, wherein scanning the determined storage regions of the list includes:

determining an initial interval value of the value range outside of the value of data at the end position, and omitting from the scan of the determined storage regions of the list the corresponding individual storage regions corresponding to the initial interval value and subsequent interval values within the sorted interval values.

3. The computer-implemented method of claim 1, wherein the specified quantity of sorted results is associated with an ascending sort and said interval value for each storage region includes the minimum value for that storage region, and scanning the determined storage regions of the list includes:

scanning individual storage regions in response to the value of data at the end position being greater than the interval value of that storage region.

4. The computer-implemented method of claim 1, wherein the specified quantity of sorted results is associated with a descending sort and said interval value for each storage region includes the maximum value for that storage region, and scanning the determined storage regions of the list includes:

scanning individual storage regions in response to the value at the end position being less than the interval value of that storage region.

5. The computer-implemented method of claim 1, further comprising exiting from scanning upon establishing that the interval value of a storage region of the sorted interval values in an ascending sort is greater than the value at the end position.

6. The computer-implemented method of claim 1, further comprising:

adding or deleting a record to a storage region;

determining whether the added or deleted record contains a minimum value or a maximum value for the storage region; and updating the storage region to reflect a new minimum value or a new maximum value.

7. The computer-implemented method of claim 1, further comprising performing a grouping operation, with groups identified based upon one or more sort keys, and wherein the specified quantity of sorted results is a specified quantity of distinct groups.

8. The computer-implemented method of claim 1, further comprising:

determining a global result value, wherein the global result value represents a minimum value of a plurality of values of data at the end position determined by a plurality of computers; and exiting from scanning the determined storage regions of the list upon establishing that the interval value of a storage region of the sorted interval values in an ascending sort is greater than the determined global result value.

9. A system comprising:

a memory comprising a plurality of storage regions, wherein each storage region is associated with an interval including minimum and maximum values indicating a value range for values of data within that storage region and with an interval value including one of the minimum value and the maximum value;

a network interface; and a processor configured to:

determine a list of storage regions with data relevant to a query requesting a specified quantity of sorted results by comparing a predicate of the query to the associated minimum and maximum values of the storage regions to identify storage regions containing values of data relevant to the query predicate, wherein two or more storage regions in the list have data with overlapping value ranges and the interval values associated with the two or more storage regions are unordered;

determine a scanning order for scanning the determined storage regions of the list for data by sorting the interval values associated with the determined storage regions of the list, and arrange the determined storage regions of the list in the scanning order according to the sorted order of the associated sorted interval values;

scan the determined storage regions of the list for data successively in the scanning order according to the sorted order of the associated interval values to determine a set of sorted results for the query; and in response to the set of sorted results attaining the specified quantity for the sorted results of the query during, and prior to completion of, the scanning of data of each of the determined storage regions of the list:

compare a value of data at an end position of the set of sorted results at a current determined storage region in the scanning order with the interval value of a next determined storage region in the scanning order that remains unprocessed by the scanning of the determined storage regions of the list;

exit from scanning the determined storage regions of the list for data prior to scanning the next determined storage region in the scanning order when the comparing indicates that the value of data at the end position of the set of sorted results resides outside the value range of the next determined storage region, wherein the exit from scanning occurs prior to scanning each of the determined storage regions of the list containing data with values relevant to the query predicate; and produce the set of sorted results as results for the query, wherein the query results are attained prior to scanning each item of data satisfying the query predicate within the determined storage regions of the list.

10. The system of claim 9, wherein the processor is configured to determine an initial interval value of the value range outside of the value of data at the end position, and omit from the scan of the determined storage regions of the list the corresponding individual storage regions corresponding to the initial interval value and subsequent interval values within the sorted interval values.

11. The system of claim 9, wherein the specified quantity of sorted results is associated with an ascending sort and said interval value for each storage region includes the minimum value for that storage region, and wherein the processor is configured to scan individual storage regions in response to the value of data at the end position being greater than the interval value of that storage region.

12. The system of claim 9, wherein the specified quantity of sorted results is associated with a descending sort and said interval value for each storage region includes the maximum value for that storage region, and wherein the processor is configured to scan individual storage regions in response to the value at the end position being less than the interval value of that storage region.

13. The system of claim 9, wherein the processor is configured to exit from scanning upon establishing that the interval value of a storage region of the sorted interval values in an ascending sort is greater than the value at the end position.

14. The system of claim 9, wherein the processor is configured to perform a grouping operation, with groups identified based upon one or more sort keys, and wherein the specified quantity of sorted results is a specified quantity of distinct groups.

15. The system of claim 9, wherein the processor is configured to:
determine a global result value, wherein the global result value represents a minimum value of a plurality of values of data at the end position determined by a plurality of computers; and
exit from scanning the determined storage regions of the list upon establishing that the interval value of a storage region of the sorted interval values in an ascending sort is greater than the determined global result value.

16. The system of claim 9, wherein the processor is further configured to:
add or delete a record to a storage region;
determine whether the added or deleted record contains a minimum value or a maximum value for the storage region; and
update the storage region to reflect a new minimum value or a new maximum value.

17. The computer program product of claim 1, wherein the computer readable program code is further configured to cause the processor to:
add or delete a record to a storage region;
determine whether the added or deleted record contains a minimum value or a maximum value for the storage region; and
update the storage region to reflect a new minimum value or a new maximum value.

18. A computer program product for providing information to a user, comprising one or more computer readable storage media collectively having computer readable program code embodied therewith, the computer readable program code, when executed by a processor, causes the processor to:

determine a list of storage regions of a memory with data relevant to a query requesting a specified quantity of sorted results, wherein the memory comprises a plurality of storage regions each associated with an interval including minimum and maximum values indicating a value range for values within that storage region and with an interval value including one of the minimum value and the maximum value, and wherein the list of determined storage regions is determined by comparing a predicate of the query to the associated minimum and maximum values of the storage regions to identify storage regions containing values of data relevant to the query predicate, wherein two or more storage regions in the list have data with overlapping value ranges and the interval values associated with the two or more storage regions are unordered;

determine a scanning order for scanning the determined storage regions of the list for data by sorting the interval values associated with the determined storage regions of the list, and arrange the determined storage regions of the list in the scanning order according to the sorted order of the associated sorted interval values;

scan the determined storage regions of the list for data successively in the scanning order according to the sorted order of the associated interval values to determine a set of sorted results for the query; and in response to the set of sorted results attaining the specified quantity for the sorted results of the query during, and prior to completion of, the scanning of data of each of the determined storage regions of the list:
compare a value of data at an end position of the set of sorted results at a current determined storage region in the scanning order with the interval value of a next determined storage region in the scanning order that remains unprocessed by the scanning of the determined storage regions of the list;
exit from scanning the determined storage regions of the list for data prior to scanning the next determined storage region in the scanning order when the comparing indicates that the value of data at the end position of the set of sorted results resides outside the value range of the next determined storage region, wherein the exit from scanning occurs prior to scanning each of the determined storage regions of the list containing data with values relevant to the query predicate; and
produce the set of sorted results as results for the query, wherein the query results are attained prior to scanning each item of data satisfying the query predicate within the determined storage regions of the list.

19. The computer program product of claim 18, wherein the computer readable program code is further configured to cause the processor to determine an initial interval value of the value range outside of the value of data at the end position, and omit from the scan of the determined storage regions of the list the corresponding individual storage regions corresponding to the initial interval value and subsequent interval values within the sorted interval values.

20. The computer program product of claim 18, wherein the specified quantity of sorted results is associated with an ascending sort and said interval value for each storage region includes the minimum value for that storage region, and the computer readable program code is further configured to cause the processor to scan individual storage regions in response to the value of data at the end position being greater than the interval value of that storage region.

21. The computer program product of claim 18, wherein the specified quantity of sorted results is associated with a descending sort and said interval value for each storage region includes the maximum value for that storage region, and the computer readable program code is further configured to cause the processor to scan individual storage regions in response to the value at the end position being less than the interval value of that storage region.

22. The computer program product of claim 18, wherein the computer readable program code is further configured to cause the processor to exit from scanning upon establishing that the interval value of a storage region of the sorted interval values in an ascending sort is greater than the value at the end position.

23. The computer program product of claim 18, wherein the computer readable program code is further configured to cause the processor to perform a grouping operation, with groups identified based upon one or more sort keys, and wherein the specified quantity of sorted results is a specified quantity of distinct groups.

24. The computer program product of claim 18, wherein the computer readable program code is further configured to cause the processor to: determine a global result value, wherein the global result value represents a minimum value of a plurality of values of data at the end position determined by a plurality of computers; and
 exit from scanning the determined storage regions of the list upon establishing that the interval value of a storage region of the sorted interval values in an ascending sort is greater than the determined global result value.

* * * * *